Patented Mar. 17, 1931

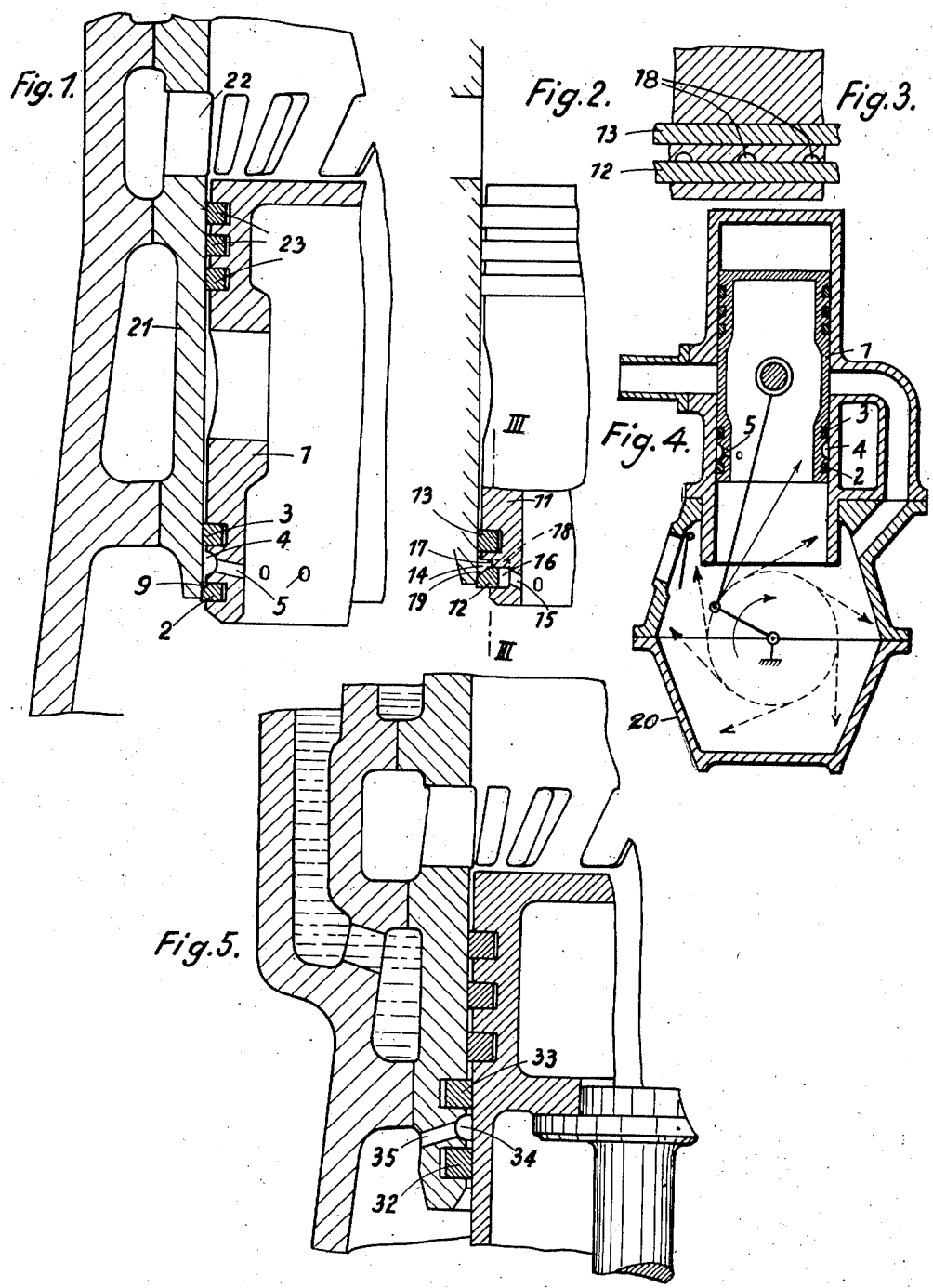

1,796,603

UNITED STATES PATENT OFFICE

HUGO JUNKERS, OF DESSAU, GERMANY

ENGINE

Application filed December 31, 1926, Serial No. 158,299, and in Germany January 29, 1926.

My invention refers to piston engines and more especially to means for wiping the contacting surfaces of the cylinder or piston so as to remove the excess of lubricant deposited thereon, which is liable to create trouble if allowed to remain between the contacting surfaces. It is an object of my invention to provide means of the kind aforesaid which are more effective and simpler than those hitherto used.

In piston engines, more especially in engines wherein the cylinders are lubricated by means of the oil splashed about by the crank gear in a closed crank case, it has proved necessary in order to avoid excessive lubrication of the cylinder surface, to provide an oil wiping device near the outer end of the piston, such device having as a rule the form of a normal piston ring which will drive the oil adhering to the cylinder wall in front of it and back into the crankcase when the piston effects its outward stroke. Similar devices of this kind have proved to be unsatisfactory, more especially in the case where a certain pressure above the normal prevails in the gear case, as is the case for instance in two-stroke cycle engines, in which this space is used either as the working chamber of the scavenging pump or as a recipient for the scavenging air. In engines of this kind the narrow space enclosed between the outer piston surface and the inner cylinder surface is constantly under a drop of pressure directed from the gear case towards the exhaust ports, such drop of pressure causing the oil which is dammed up in front of the wiper ring when the piston moves outwards, to slowly pass in small quantities across the ring towards the side of the lower pressure. This moving of the oil will take place even in the case of well fitting wiper rings inasmuch as even in such case the oil can still travel across the ring lock. Moreover the ring is always seated in its groove with a certain play, so that the oil can travel around the inner ring surface. In the latter case the comparatively low pressure in the gear case does not suffice to permanently force the ring against one side wall of its groove, so that the ring will move to and fro in the longitudinal direction of the piston, whereby the passage of oil across the ring groove is materially facilitated. The quantities of oil escaping in such manner amount as a rule to a considerable percentage of the total oil consumption.

The provision of several such wiper rings has no materially better effect, for although the drop of pressure near each ring is lowered, there still remains over a certain drop of pressure which tends to facilitate the passage of oil.

The present invention is intended to avoid these drawbacks by providing separate rings or groups of rings for the removal of the oil and for sealing the gap between the piston and cylinder, the arrangement being such that a ring or a group of rings adjoining the crank case serves for wiping the sealing surface, while a ring or group of rings adjoining the interior of the cylinder serves for sealing the gap between the parts. Intermediate the two rings or groups of rings is enclosed a space which communicates with the gear case by ports or conduits and in which consequently prevails the same pressure as in the gear case. In this manner no drop of pressure can arise near the oil wiper rings and no passage of oil will take place across these rings.

In the drawings affixed to this specification and forming part thereof several modifications of a device embodying my invention are illustrated diagrammatically by way of example.

In the drawings

Fig. 1 is a partial longitudinal section of a piston and a cylinder of an internal combustion engine, Fig. 2 is a similar view of another modification, Fig. 3 is a partial circular section across the piston shown in Fig. 2, taken on the line III—III in Fig. 2, Fig. 4 is a diagram of a piston and crank gear illustrating the way in which the oil is splashed about in the crank case.

Fig. 5 is a view similar to Fig. 1 illustrating a third modification.

Referring first to Fig. 1, 1 is the piston and 2 is a wiper ring seated in a grove close to the outer end of the piston. Near the wiper ring 2 is arranged a packing ring 3 seated in a circular groove of its own. Intermediate the two rings is arranged a circular groove 4, which communicates with the inner piston wall and the gear case by way of perforations or conduits 5. 23 are further packing rings seated in grooves near the inner end of the piston. 21 is the cylinder wall and 22 are exhaust ports provided therein.

Before reaching the outer dead centre position shown in the drawings, that part of the piston intermediate the main packing ring 23 and the auxiliary packing ring 3 is moved past the exhaust ports 22 and in consequence thereof substantially atmospheric pressure prevails in the narrow annular gap confined between these packing rings and the piston and cylinder walls. In consequence of pressure above normal prevailing in the gear case the oil adhering to the cylinder wall is caused to travel in the direction towards the exhaust ports. However, in the arrangement illustrated in the drawing, in which the annular gap of which the groove 4 forms a part, communicates with the gear case, both sides of the oil wiper ring 2 are under the same pressure, so that the oil wiped off the cylinder wall by this ring and dammed up in front of this ring is not subjected to a one sided pressure and therefore has no tendency to pass to the other side of the ring.

A certain drawback in this arrangement consists in the comparatively large space required for the rings and the annular space enclosed between them, which renders necessary a correspondingly longer piston and engine frame. This drawback is obviated in the modification illustrated in Fig. 2, where a wiper ring 12 and a packing ring 13 are disposed near the outer end of the piston 11, the two rings being only little spaced from each other. Here the groove 16, in which the wiper ring 12 is seated is so deep that a comparatively large gap exists between the bottom of this groove and the inner surface of the ring. Furthermore the outer piston wall is bevelled near the groove at 17 to the extent of forming an annular chamber directly adjoining the wiper ring on the side directed towards the inner end of the piston. This annular space 14 communicates with the annular gap 16 at the back of the ring by conduits 18, and the gap 16 communicates with the gear case by conduits 15. Owing to this arrangement the same pressure prevails in the annular chamber 14 as in the gear case, so that no drop of pressure can exist near the wiper ring 12. The rings 12 and 13 can thus be placed comparatively close together, so that the piston need not be made longer than usual.

Preferably the conduits 5 (Fig. 1) and 15 (Fig. 2) are arranged only on that side of the piston which is not affected by the oil splashed about in the gear case. To this end they are arranged only on that side of the piston which is nearest to the crank when the crank approaches the cylinder. This is illustrated in the diagram shown in Fig. 4, where the crank 20 is shown to splash the oil tangentially, as shown by the arrows, whereby the oil will not come in contact with the inner side of the piston adjoining that part of the cylinder which is nearest to the crank when it approaches the cylinder.

In Figs. 1 and 2 the wiper rings 2 and 12, respectively, are bevelled (at 9 and 19, respectively) on their inner sides, whereby the oil is drawn inwards, when the piston executes its inward stroke. The packing rings 7 and 13 may be bevelled in a like manner.

The packing rings and, in those cases where the pistons are arranged to project largely from the cylinder, as is the case for instance in engines provided with separate crossheads, also the wiper rings, can also be seated in the cylinder wall and in this case the annular gap enclosed between them can be made to communicate with the gear cases across the cylinder wall. This is shown diagrammatically in Fig. 5, where 32 is a wiper ring, 33 the packing ring adjoining it, 34 the annular groove enclosed between them, and 35 the conduits extending across the cylinder wall 36.

I wish it to be understood that I do not desire to be limited to the exact details of construction shown and described for obvious modifications will occur to a person skilled in the art.

I claim:—

1. An engine comprising a cylinder, a piston reciprocally mounted in said cylinder, a crank case connected to said cylinder, a packing ring and a wiper ring carried by one of said parts in relatively closely spaced relation, with the wiper ring adjoining said crank case, said last-mentioned part having an oil-collecting groove intermediate the two rings, and an outlet connecting said groove to said crank case, so that said wiper ring is subjected to the pressure in said crank case on both sides.

2. An engine comprising a cylinder having piston-controlled exhaust ports in the wall thereof, a closed crank case adapted to contain scavenging air at elevated pressure connected to said cylinder, a piston reciprocally mounted in said cylinder, a packing ring carried by one of said parts and arranged between said exhaust ports and said crank case, a wiper ring arranged between said packing ring and said crank case, said last-mentioned part having an oil-collecting groove intermediate the two rings, and an outlet connecting said groove to said crank case, so that said wiper ring is subjected to the pressure in said crank case on both sides.

3. An engine comprising a cylinder, a piston reciprocating in said cylinder, one face of said piston adjoining a working chamber in said cylinder, the other face adjoining a closed space adapted to contain scavenging air at elevated pressure, means adapted to splash lubricant in this space, the wall of said cylinder being formed with ports open to the atmosphere and adapted to be controlled by said piston, a wiper ring on said piston near said space, and a packing ring on said piston spaced farther from said space but between said ports and said space, an oil-collecting groove intermediate the two rings, and an outlet connecting said groove to said space, so that said wiper ring is subjected to the pressure in said space on both sides.

4. An engine comprising a cylinder, a piston reciprocating in said cylinder, one face of said piston adjoining a working chamber in said cylinder, the other face adjoining a closed space adapted to contain scavenging air at elevated pressure, means adapted to splash lubricant in this space, the wall of said cylinder being formed with ports open to the atmosphere and adapted to be controlled by said piston, a wiper ring on said piston near said space, and a packing ring on said piston spaced farther from said space but between said ports and said space, an oil-collecting groove intermediate the two rings, said groove being formed by a shallow lateral enlargement of the groove containing one of said rings, said enlargement being positioned on that side of said ring which faces the other ring, and an outlet connecting said groove to said space, so that said wiper ring is subjected to the pressure in said space on both sides.

In testimony whereof I affix my signature.

HUGO JUNKERS.